United States Patent [19]
Seifert

[11] 4,058,065
[45] Nov. 15, 1977

[54] SPRING STUB AXLE RAILWAY VEHICLE

[76] Inventor: Arthur Seifert, Box 41, Sound View Station, New York, N.Y. 10472

[21] Appl. No.: 625,261

[22] Filed: Oct. 23, 1975

[51] Int. Cl.$^2$ .............. B60B 35/14; B61F 3/16; B61F 5/28; B61F 5/38
[52] U.S. Cl. .................. 105/180; 104/1 A; 105/223; 295/38; 308/55; 308/180
[58] Field of Search .............. 104/1 A, 244; 105/215 C, 180, 215 R, 169, 223; 295/1, 36 R, 37, 38, 39; 308/38, 55, 180

[56] References Cited

U.S. PATENT DOCUMENTS

| 236,516 | 8/1882 | Hersee | 105/180 |
|---|---|---|---|
| 554,644 | 2/1896 | Belk | 104/244 |
| 1,009,747 | 11/1911 | Hewitt | 105/223 X |
| 1,141,029 | 5/1915 | Whittenburg | 105/223 |
| 1,247,928 | 11/1917 | Buckwalter | 308/180 |
| 1,529,101 | 3/1925 | Wiesinger | 104/244 |
| 1,742,154 | 12/1929 | Vernon | 105/215 C |
| 2,046,448 | 7/1936 | De Buigne | 104/244 X |
| 2,727,780 | 12/1955 | Lorig et al. | 295/36 R |
| 3,434,432 | 3/1969 | Seifert | 105/215 C |
| 3,945,326 | 3/1976 | Seifert | 105/215 C |
| Re. 15,599 | 5/1923 | Cite | 105/223 |

FOREIGN PATENT DOCUMENTS

| 696,185 | 9/1940 | Germany | 105/180 |
|---|---|---|---|
| 308,660 | 10/1918 | Germany | 295/8.5 |

Primary Examiner—Robert J. Spar
Assistant Examiner—Howard Beltran
Attorney, Agent, or Firm—John J. Hart

[57] ABSTRACT

The railway truck disclosed herein is provided with a split axle composed of two transverse aligned axle members each having mounted on the outer end thereof a rail wheel. The inner ends of the axle members in one embodiment are connected by means forming a movable joint between such inner ends to enable the axle members to be moved to raise the rail wheels from the tracks, such connecting means also including means to restrict the relative movements of the two axle members. In this embodiment the two axle members are pivotally connected to the vehicle by means which enables lateral movement of such members during such relative movements thereof. Means are provided to raise the jointed inner ends of such axle members to raise the rail wheels. In another embodiment, the outer end of each axle member is supported by a main load carrying floating bearing construction permitting movement of such member about a pivot point located directly above the rail. The inner end of each axle member is supported by a bearing construction slidably mounted in a housing to permit of transverse movement of such inner end about said pivot point. The housing includes means to restrict and cushion the transverse movements of the inner end of the axle member. In both embodiments, the axle members are disposed at an angle of less than 90° to the vertical so that the wheels are tilted inwardly from the vertical. Further, the rail wheels each have a riding surface which converges toward the flange thereof so that a line projecting inwardly from such surface is disposed at a given acute angle to the central longitudinal axis of the wheel axle.

5 Claims, 6 Drawing Figures

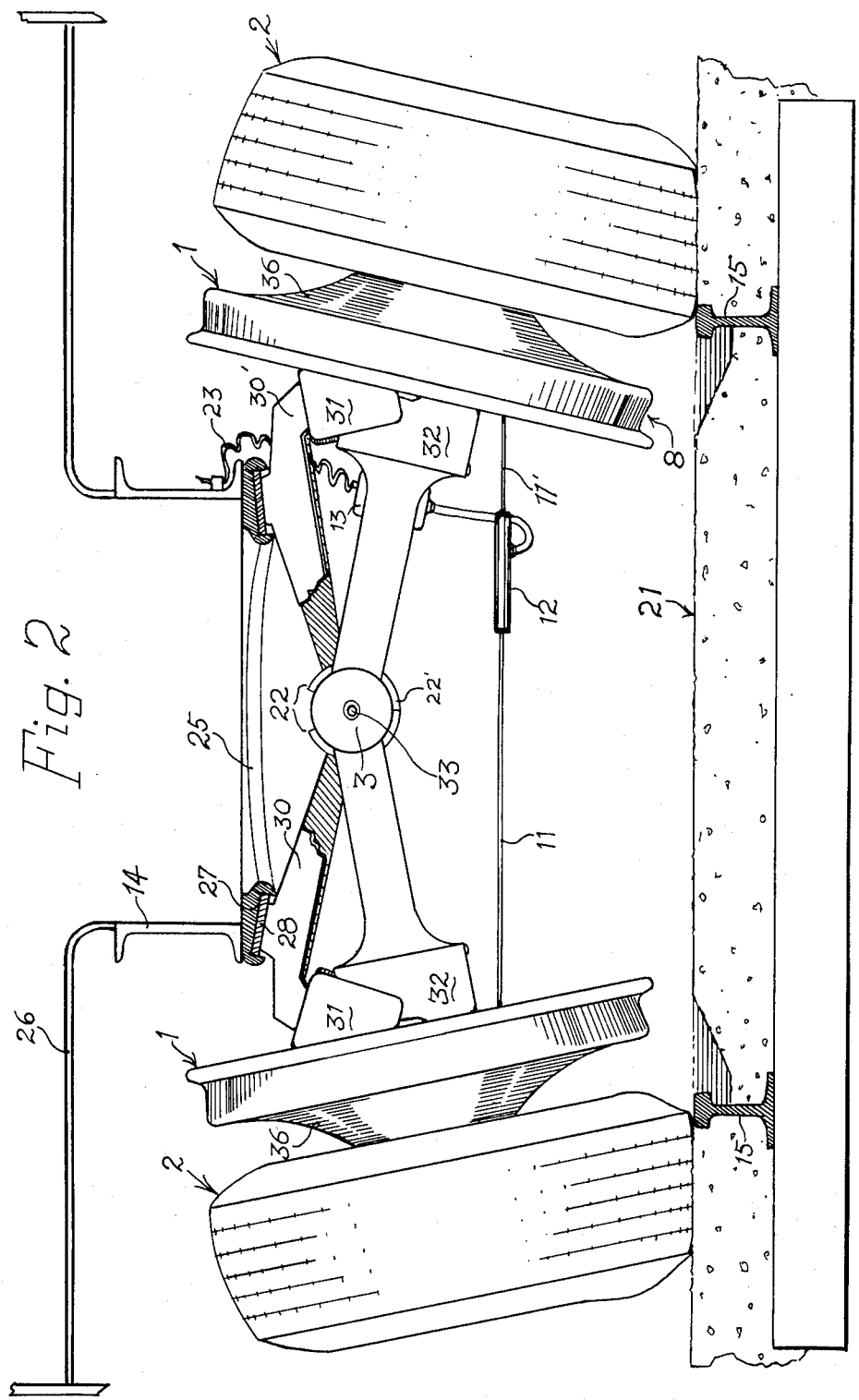

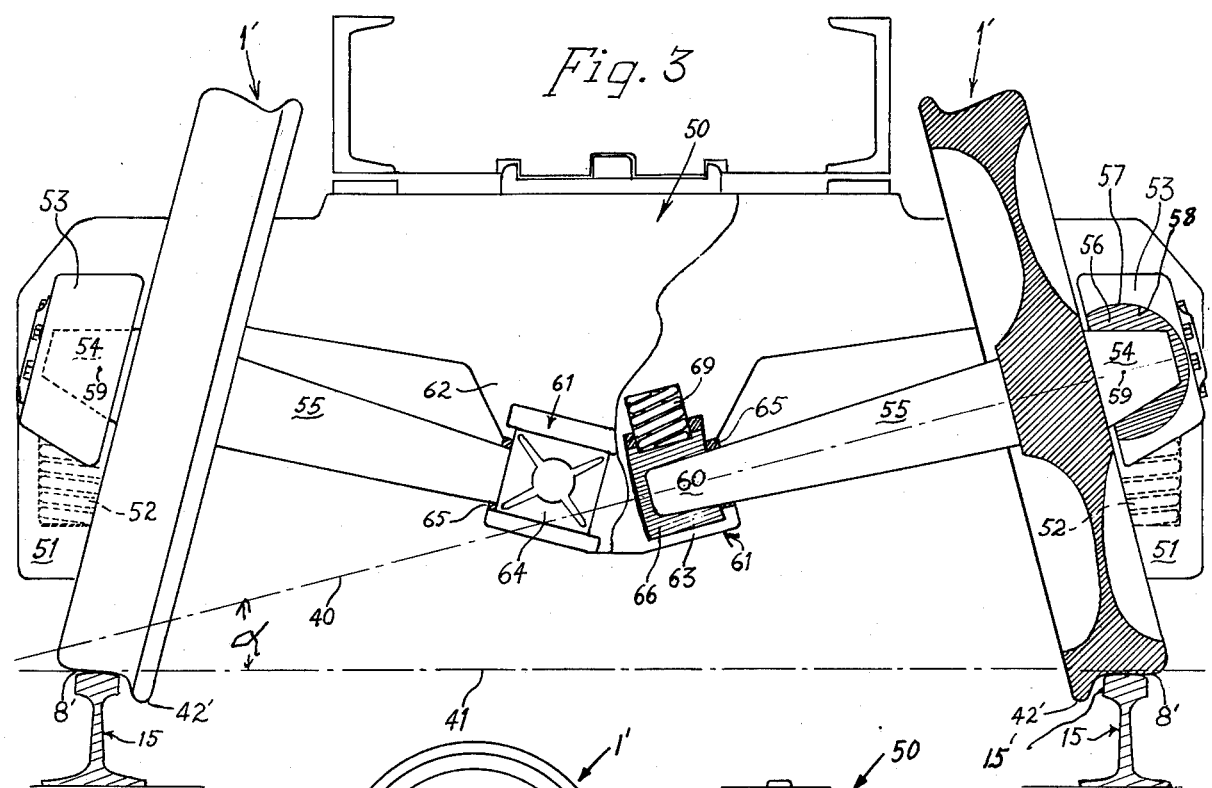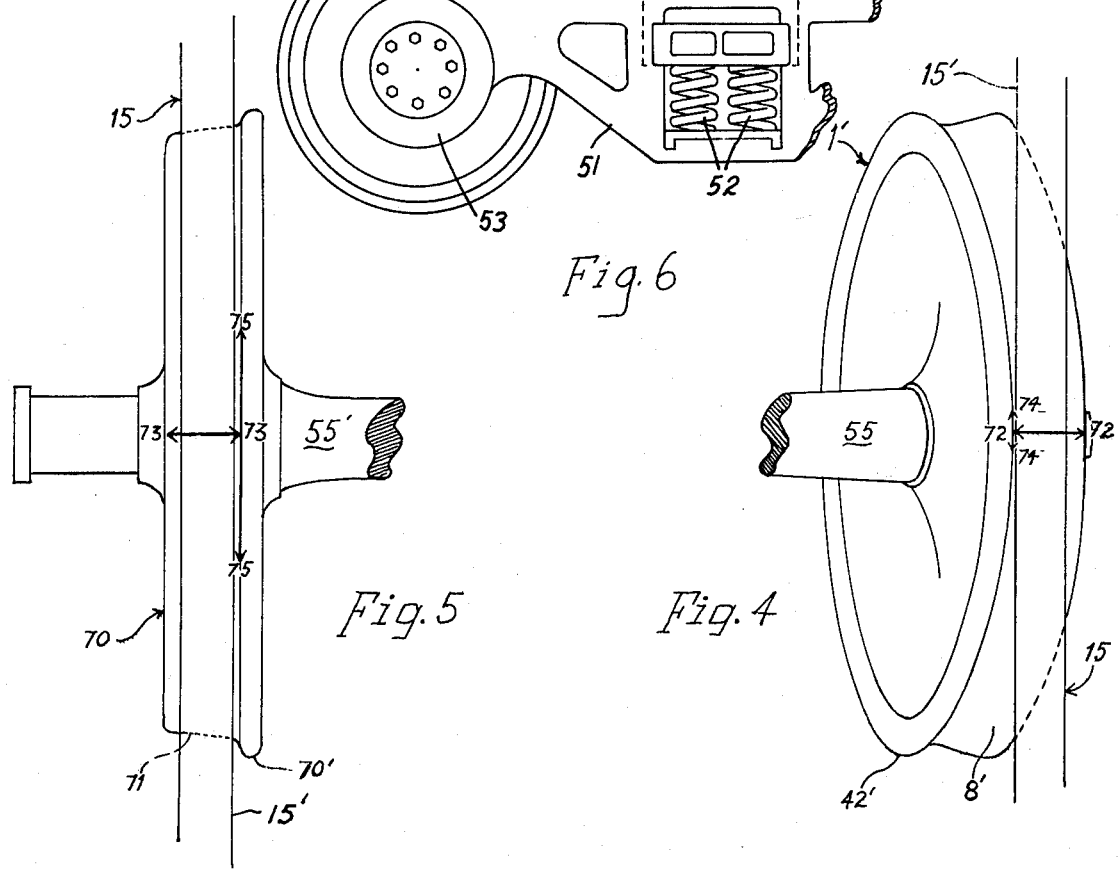

SPRING STUB AXLE RAILWAY VEHICLE

THE INVENTION

This application is an improvement over my original application Ser. No. 542,960, filed Jan. 22, 1975, now Pat. No. 3,945,326, issued Mar. 23, 1976, for Railway Vehicle with additional subject matter.

This invention relates to railway vehicles and provides distinct advantages for those urban and suburban transportation systems which are based upon the use of a vehicle designed for both rail and road operations such as the type of vehicle disclosed in my U.S. Pat. No. 3,434,432 granted Mar. 25, 1969.

In the operation of the vehicle disclosed in my aforesaid patent, it made its transfer from the rail tracks to the roadway and vice versa, at given locations by means of ramps constructed to cause the pneumatic tires riding thereon to lift the rail wheels associated therewith onto and off the rails depending on the direction in which the vehicle was traveling on the ramp. This method of transferring the vehicle required major changes to the rail right of way, in the removal of switches and modification of the same, that were costly and impractical.

A further problem, and this is not limited to the type of vehicle disclosed in my aforesaid patent, but applies also to the standard railroad cars now in use, is the side-cutting of rails and switches and the wear on the wheel flanges due to the construction of the present type of rail wheel. Not only is this resulting wear on tires and rails a costly burden to the railroads, but the sharp-edged tire flanges produced by this wear are the cause of many derailments. The high frictional resistance involved in such unwanted wear also generates a disconcerting wheel squeal and causes considerable resistance to the operableness of the train. The added drag to a train caused by this friction necessitates that the fuel consumption thereof be greatly increased over that otherwise required. The only known method presently employed to cope with this problem is lubrication of the tracks.

One of the principal objects of the present invention is to provide in a vehicle of the indicated type an improved running gear construction that will enable the vehicle to be used on existing rail beds without necessitating that any changes be made in the latter or the use of ramps.

Another object of the invention is to provide an improved rail wheel design which will lessen the disadvantages of the presently constructed rail wheel and enable the vehicle to operate satisfactorily without the front guide wheels provided on the vehicle disclosed in my aforesaid prior patent.

Other objects of the invention as well as the novel features thereof will appear from a consideration of the following description, when read in connection with the accompaying drawings, in which FIG. 1 is an elevational view of one of the wheel trucks of the vehicle and shows the manner in which the rail wheels of the truck are mounted on the rails of a railway on which the vehicle is traveling;

FIG. 2 is a view similar to FIG. 1 and shows the arrangement of the parts when the wheel truck is traveling on a roadway;

FIG. 3 is a view similar to FIG. 1 and shows a modified form of the invention embodied in a railroad wheel truck;

FIG. 4 is a plan view of one of the wheels shown in FIG. 3 looking up from the rail bed;

FIG. 5 is a view similar to FIG. 4 but showing a standard rail wheel and axle; and FIG. 6 is an elevational view of the right side of the truck shown in FIG. 3.

Figure 1:
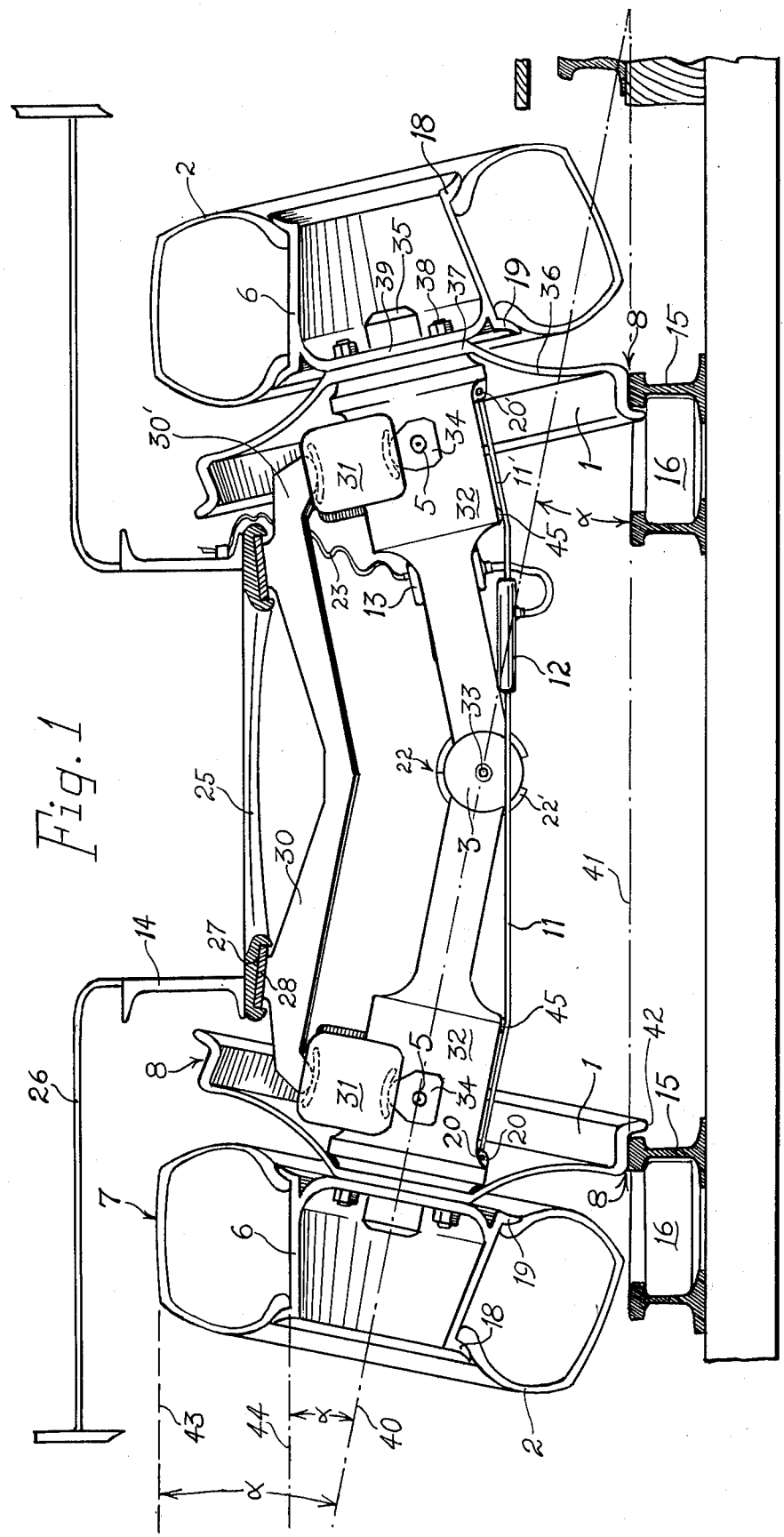

It will be understood that while certain features of the invention are applicable to all rail vehicles, when the features of the invention are embodied in a vehicle of the type disclosed in my aforesaid U.S. Pat. No. 3,434,432, such vehicle will include a bus body mounted on a frame supported through front and rear mountings on the running units or wheel trucks. The front and rear mountings will be each composed of two relatively movable, circular bearing surfaces and will be connected by crossed steering cables. A conventional steering wheel in the bus may be connected to one of the bearing surfaces of the front mounting in the manner disclosed in said patent.

In accordance with this invention, the front and rear mountings for the front and rear running gear unit each comprise an annular bearing member 25 fixedly secured to the frame 14 of the vehicle body 26 in any suitable manner. The annular member 25 is provided with two depending peripheral guide flanges defining on the underside of the member 25 a circular bearing surface 27 against which is rotatably seated the upper surface of a circular annular bearing plate 28. The bearing plate 28 is mounted on a transverse frame 30 having at its ends depending arms 30' which are secured at their lower ends to the upper ends of two depending pneumatic springs 31 of standard construction. Secured to the lower end of each pneumatic spring 31 are two depending straps 34 which at their lower ends are pivotally connected at 5 to the drive housing 32 containing the motor for driving the associated rail wheel 1 and pneumatic wheel 2. Thus, the entire weight of the vehicle will through the frame 14, bearing members 25 and 28, frame 30 and its arms 30', pneumatic springs 31, straps 34 and pivot connections 5, bear on the outer end portions of the two drive housings 32,32 in each of the front and rear running gear units of the vehicle.

The two drive housings 32,32 in each running gear unit are connected together at their inner ends by a ball joint elbow connection 3 of known construction to permit of pivotal movement of such housings about the pivots 5 in a vertical plane at right angles to the longitudinal centerline of the bus. During such pivotal movement of the drive housings, the pivotal axis 33 of such elbow connection 3 reciprocates vertically in a vertical plane containing such centerline. This toggle-like movement of the drive housings 32,32 is facilitated by the action of the pneumatic springs 31 which in addition to their cushioning functions, permit the minor lateral changes in position of such housings which are necessary to enable them to effect such movement. The elbow connections 3 in each of the running gear units is provided with two sets of coacting dogs, one set 22 coacting to limit the downward movement of the elbow connection, pivot axis 33 as is shown in FIG. 1 of the drawings, and the other set 22' of such dogs coacting to limit the upward movement of the pivotal axis 33 as shown in FIG. 2 of the drawings. Upward movement of the pivotal axis 33 and of the inner ends of the housings 32,32 about the pivots 5 to the positions shown in FIG. 2, is attained by transversely extending cable lengths 11,11' attached at their outer ends to the outer end portions of such housings at the points 20,20', respectively. The points of cable attachment 20,20' are located outwardly of the two pivot points 5,5 of such housings. The inner ends of the cables 11,11' are connected to a conventional hydraulic piston unit 12 which is driven by a servo pump 13 of known construction and connected by electrical wiring 23 to an operator controlled switch mounted on the dashboard of the bus in a manner known to the art. When the hydraulic pressure in the piston unit 12 is released to enable the housings 32,32 to assume the positions shown in FIG. 1 of the drawings, the weight of the vehicle on the pivot points 5 forces the points 20,20' apart and the elbow connection downwardly, thereby causing the housings 32,32 to pivot downwardly until the dogs 22,22 engage to stop such movement. It will be understood that such downward movement of the housings may be rendered more positive by connecting cable lengths to the upper outer end portions thereof in the manner of the cables 11,11' and controlling their operation by a piston unit and servo pump controlled from the dashboard of the bus in the manner above described with respect to the unit 12 and pump 13.

In a manner similar to that shown in my U.S. Pat. No. 3,434,432, each of drive housings 32 contains a wheel axle 35 that is driven through a fluid drive or other suitable torque converter transmission by an electrical motor also contained in the housing. On the outer end of each axle 35 is a wheel assembly composed of a hollow rail wheel 1 having an outwardly extending portion 36 terminating in an offset central wall portion 37 which abuts and is secured by lug bolts 38 to the inner wall 39 of a hollow rim 6 for the pneumatic tire 2. Thus, the outer end of each axle 35 has mounted on the outer end thereof as a unit, a rail wheel 1 and a tire wheel 2. Conventional brakes are associated with the connected pairs of pneumatic and rail wheels in the manner shown in my aforesaid patent.

It is to be noted in FIG. 1 of the drawings that when the rail wheels 1 are resting on the rail tracks 15 they tilt inwardly from the vertical in the upward direction so that the axle 35 associated with each wheel is disposed at an angle to the horizontal less than 90°. It is also to be noted that the riding surface 8 of each wheel 1 converges or inclines inwardly toward the flange 42 of the rail wheel. As is shown in FIG. 1 of the drawings, a line 41 forming an inward extension of such riding surface 8 is disposed at an acute angle $\alpha$ to an axial centerline 40 projecting inwardly from such rail wheel and common to the central longitudinal axis of the wheel axle 35. It has been found that in a vehicle of the type above described, if this angle $\alpha$ is between 5 and 25 degrees there will result a proper and securer seating alignment of the rail wheel riding surfaces with the running surfaces of the rails, while at the same time, the flanges on the rail wheels will be disposed at such curved relationship to the inside vertical surface on the head of the rail that there is substantially less area of contact therebetween than normally occurs between said rail surface and the flange of the customary type of rail wheel. This, it is believed effects a substantial reduction in friction between such two contacting surfaces resulting in less flange and rail wear and squeal. The preferred angular disposition of the riding surfaces 8 of the rail wheels when such wheels are mounted on a bus as above described is approximately 10°, but this angular disposition may be increased substantially above 25° when such wheels form part of the usual running gear used solely for railroading purposes, i.e., as much as 45°.

The pneumatic wheels 2 also have an acute angle relationship between the tread surfaces 7 thereof and the axial center lines thereof, but in a direction opposite to that of the rail wheel riding surfaces 8. Thus, as shown in FIG. 1 of the drawings, while the pneumatic wheels 2 are tilted inwardly upwardly so that as a whole each wheel tire is disposed substantially parallel to each tire wheel as a whole, the tread surface 7 of each tire converges or inclines outwardly toward the outwardly projecting portion of the axial centerline 40 of that tire wheel. The angular relation is preferably such that a line 43 forming an outward extension of the tread surface 7 will form with the outwardly projecting portion of the axial centerline 40 an acute angle substantially similar to the aforesaid angle $\alpha$; that is, between 5° and 25°. With the tread surfaces 7 disposed in this angular fashion, the tires will properly engage the road surface when the running gear parts are arranged as shown in FIG. 2 of the drawings. Proper use of the tires, together with efficient traction and improved tire side roll characteristics will be achieved if the tire rims 6 are also constructed to conform to this angular relation. Thus, as is shown in FIG. 1, the outside retainer lip 18 of the rim 6 is made smaller in diameter than the rims inside retainer lip 19 and the dimensions thereof are so related that a line 44 forming an outward extension of the resulting frusto-conically shaped tire seat of the rim 6 will also form with the axial line 40' the acute angle $\alpha$.

It will be understood from the foregoing, that when the parts of the front and rear running gear units of the bus are arranged as shown in FIG. 1 of the drawings with the rail wheels 1 in their lowermost position and riding on the tracks 15, the elbow connectors 3 will be in their lowermost positions with the dogs 22 associated therewith in abutting engagement, and the pneumatic wheels 2 will be in a raised position and located above the rail tracks. In such arrangement of the running gear parts, the bus can properly travel on the railroad tracks without the pneumatic wheels 2 coming into contact with rail switches 16 in FIG. 1 or rail crossings 21 in FIG. 2. As previously indicated, such travel, due to the unique configuration of the riding surfaces 8 of the rail wheels, will be accomplished with a minimum of friction, flange wear and squeal and with a sureness of seat by the wheels on the rails that the possibility of derailment is minimized.

When the bus arrives at a rail crossing 21 in FIG. 2 at which the operator is to leave the railroad for travel on the highway, and while the bus is still in motion, the operator activates the servopump 13 to cause the piston unit 12 and cables 11,11' to pivot the drive housings 32 about their pivotal axes 5 and raise the elbow connection 3 until the dogs 22' come into engagement and stop such movement. It is to be noted that the points 20,20' to which the outer ends of the cables 11,11' respectively, are connected, are located on the underside of the drive housing 32 outwardly of the pivots 5,5, and that such cables are in engagement with abutments 45,45' provided on the underside of such drive housings 32 inwardly of the pivots 5,5. When the parts are arranged in the manner shown in FIG. 1, the abutments 45,45' will be lower vertically than the points 20,20'. Accordingly, when the piston unit 12 exerts contracting forces on the cables 11,11', an upward force will initially be exerted by such cables on the abutments 45,45' and then as the cables become horizontal between the points 20,20', at which time the abutments 45,45' and the housings 32,32 will be horizontally aligned, the contracting forces exercised by the piston unit 12 on the cables 11,11' will be applied directly on the points 20,20' to pivot the housings 32 and raise the joint 3 until the dogs 22' come into engagement, as shown in FIG. 2 of the drawings. Thus, the housings 32, their elbow joint 3, the cables 11,11', the piston unit 12, the connections 20,20' and the abutments 45,45', function in the nature of a toggle joint to pivot the housings 32, within a range the limits of which are determined by the dogs 22,22'. The pneumatic springs 31 permit the housings 32 during such upward movement to shift laterally outwardly as the pivotal axis 33 passes through a horizontal plane momentarily containing the longitudinal axes of such housings and then move the housings laterally inwardly as the inner ends of the housings move above such plane. During such upward pivotal movement of the housings 32, the pneumatic tires 2 will pivot downwardly about the pivots 5 until the tread surfaces 7 thereof come into engagement with the crossing 21 and then as the housings complete their turning movement the tires 2 will press on the crossing 21 and cause the rail wheels 1 to be raised from the rails 15 in the manner shown in FIG. 2 of the drawings. The bus will then be in a condition to proceed on its journey along the highway.

When the bus is to be remounted on the rail tracks, it is driven onto the crossing 21 where this transfer is to take place and properly aligned with the rail tracks. While the bus is still in motion, the operator then actuates the servopump 13 to cause the piston unit 12 to release its contracting force on the cables 11,11', whereupon the weight of the vehicle bearing on the pivots 5,5 will force the inner ends of the housings 32 and the elbow joint 3 downwardly until the parts assume the arrangement shown in FIG. 1 of the drawings. As previously explained, this action may be made more positive by installing above the housings 32 an arrangement similar to that shown with respect to the cables 11,11', piston unit 12, servopump 13, points 20,20' and abutments 45,45'.

FIGS. 3 to 6 of the drawings shows two rail wheels 1' embodying the invention forming part of the usual running gear employed solely for railroading purposes. In this figure, the reference numeral 50 designates generally a railroad truck of known construction. As usual, such trucks have depending outer side supports 51 containing springs 52 for yieldingly supporting axle bearing blocks 53. In accordance with this invention, the outer ends 54 of transversely aligned split axles 55 are contained within the bearing blocks 53 which are mounted on the truck 50 so that they are located directly above the rails 15. The axle ends 54 are tapered outwardly to give them a frusto-conical shape and have mounted thereon bearings 56 which may be of any suitable construction, such as a roller bearing, or a solid bronze bearing, but are constructed to have a rounded or spherical peripheral seating surface 57. The bearings 56 are movably seated in rounded seats 58 formed within the blocks 53 to permit of pivotal movement of the axles 55 about pivot points 59 located directly above the rails 15.

The inner ends 60 of the axles 55 are tapered and are located in housings 61 secured to a depending frame portion 62 of the truck 50. The housings 61 each have an open end 63 which is normally closed by a cover plate 64. The outer opposed sides of the housings 61 are provided with open ended slots 65 through which the axles 55 extend. It is to be noted that the slots 65 have a greater width than the diameter of the portions of the axles located within such slots to permit movement of the axles relative to the housings in a manner to be hereinafter explained. Located within the housings 61 are bearing blocks 66 made of suitable bearing material, such as bronze, and enclosing the inner axle end portion 60 to take care of all lateral and longitudinal forces exerted on the axle. The bearing blocks have a height less than the height of the chambers in the housings 61 so that they will function in the nature of pistons in such chambers. The bearing blocks 66 are normally maintained in their lowermost positions wherein they are seated on the bottom walls of the housings by shock dampening springs 69.

The flanged rail wheels 1' are mounted on the axles 55 adjacent to the tapered ends 54 thereof. Preferably the taper of the axle ends 54 should be such that when the wheel is in engagement with the rail 15, a plane tangent to the top of axle end 54 will be substantially horizontal. Like the previously described rail wheel 1, the rail wheels 1' are tilted inwardly from the vertical in the upward direction with their associated axles 55 disposed at an angle to the horizontal less than 90° and the riding surfaces 8' thereof generally converge or incline inwardly toward the flanges 42' of such rail wheels. Thus, as in the case of the previously described embodiment, a line 41 forming an inward extension of a line indicating the general transverse contour of such riding surface 8' of a rail wheel 1', is disposed at an acute angle $\alpha$ to an axial centerline 40 projecting inwardly from such rail wheel and common to the central longitudinal axis of the wheel axle 55. As previously stated this angular disposition of the riding surfaces 8' may be within a range having a minimum of 5 degrees and a maximum which is substantially above 25°, say of the order of 45°.

It will be understood that as a result of the above described construction, in the use of a railroad vehicle so equipped, a major portion of the load of the vehicle, as much as 99%, will be taken up by the bearings 56 which are positioned directly above the riding surfaces 8' of the rails and that only a small portion of such load will be applied to the bearing block 66. This distribution of the weight on the running gear of the vehicle enables it to be provided with lighter axles and a narrower and stronger truck frame. Because of the split axle construction, there is provided during the travel of the vehicle a differential action which eliminates slippage of the wheels due to differences in the diameters of paired wheels because of uneven wear and when the vehicle is going around curves in the track. The split axle construction also enables the running gear of a vehicle to be arranged so that the leading paired wheels of such vehicle are slightly toed in and the traveling wheels of such vehicle are slightly toed out. Such a toed-in arrangement of the wheels, it is believed, would further reduce flange scuffing and the possibility of derailment, such as by wheel climb-up. This arrangement of axles, bearings and springs will also reduce lateral shock to the truck of the vehicle during its usage. Thus any track conditions during such usage tending to move a wheel from its normal tilted position about the pivot point 59 to a more vertical position would exert an upward thrust on the bearing block 66 and would be dampened and absorbed by the spring 69. Any tendency of the axle and wheel to turn about the pivot point 59 in the opposite direction is blocked by the wall portion of the housing 61 forming the lower edge of the slot 65 in such wall which functions on a stop against such movement of the axle and wheel. The advantages of the construction of the wheel of this invention over the standard type of rail wheel is believed to be apparent from a comparison of FIGS. 4 and 5. In these figures the inside surface of the head of the rail 15 which is engaged by the flanges of the rail wheels, is indicated by the reference numeral 15'. While the areas of rail contact between the riding surfaces 8' and 71 of the wheel 1' of this invention and the standard rail wheel 70, respectively, are substantially the same, as indicated by the transverse lines 72—72, 73—73, respectively, the areas of rail contact by the flanges of such wheels are substantially different. Thus, as is shown, the area of contact of the inside of the flange 42' of the wheel 1' with the inside surface 15' of the head of the rail 15, as indicated by the line 74—74 in FIG. 4, is substantially less than the area of contact of the inside of the flange 70' of the wheel 70 with the inside rail head surface 15', as indicated by the line 75—75 in FIG. 5. These differences in the areas of scuffing and wiping action in the use of the two wheels are so material that employment of the wheel 1' of this invention will substantially reduce friction, flange wear, rail wear and squeal. The reduction which would be achieved in frictional forces and drag, it is believed, would enable a substantial reduction in the tractive force needed to move a train equipped with the wheels of this invention through curves, switches, grades and stretches with substandard conditions. As in addition to such material reduction in friction because of the design and arrangement of the wheels per se, the novel construction of axle, spring and wheels substantially reduce lurching, and pounding, and the possibility of climb-up and other factors that cause derailments, higher speeds with greater safety are also possible of attainment. This construction also provides certain advantages in connection with the replacement of parts. Currently when a bad wheel, or wheels, must be replaced on a railroad truck, it is necessary to jack up the railway car and replace the entire truck, or one wheel set. This is a costly and time consuming process. With applicant's new tilt wheel and split axle design, a replacement of the same can be easily and quickly accomplished by jacking up the truck about one inch, removing the cover plate on the inner axle housing, and removing only the damaged wheel and axle unit. A replacement can then be slipped into place with minimal effort and cost, the conical journal bearing design enabling each insertion of the outer axle end into proper position.

I claim:

1. In a load carrying truck having side frames for a vehicle traveling on rails having standard heads provided with conventional horizontal running surfaces, paired half axles, each having mounted on the outer portion thereof a rail wheel generally disposed at right angles thereto, each of said half axles being rigid and straight and disposed so that its straight longitudinal axle is inclined downwardly and inwardly at a given vertical angle to the horizontal to tilt its associated rail wheel inwardly from the vertical at an angle approximating said given vertical angle, each of said rail wheel being rigid and fixedly connected to its associated half axle, and each of said rail wheels having a tire portion constituted of a rail flange and a rail riding surface extending outwardly from said flange, said riding surface having a generally frusto-conical configuration and converging inwardly toward said rail flange to provide a transverse line of contact with the horizontal running surface of a conventional rail head disposed substantially horizontally and substantially at said given vertical angle to the central longitudinal axis of its associated half axle, and so that said rail flange is inclined upwardly and inwardly from the inner end of such horizontal transverse line of contact, first means pivotally and rotatably holding the outer portion of each of said half axles in the truck side frames, and second means resiliently mounting said half axles between said two first means to said truck to enable articulation of such half axles about the pivots provided by said first means and to confine such articulation to a given range in a generally vertical plane.

2. In a truck such as defined in claim 1, in which each of said half axles has an outer terminal end projecting beyond its associated rail wheel, and in which said first means associated with each half axle comprises a bearing enclosing said outer terminal end of such half axle, and means movably supporting said bearing to permit vertical articulation of such half axle about a point located within said outer terminal end and directly above the horizontal running surface of the rail on which its associated rail wheel is mounted.

3. In a truck as defined in claim 2, in which said bearing is provided with a rounded peripheral surface, said bearing supporting means comprising a bearing block having a rounded seating surface for said bearing and configured to permit movement of said bearing relative thereto, and means for yieldably supporting said bearing block on a vehicle.

4. In a truck as defined in claim 2, in which said bearing supporting means is connected to the vehicle and through said bearing imposes a portion of the vehicle load upon said outer terminal end of said associated half axle, and in which said outer terminal end of each half axle is frusto-conically shaped and converges outwardly to maintain an upper longitudinally and horizontally disposed vehicle load bearing surface as said half axle rotates.

5. In a truck as defined in claim 1, in which said second means comprises a bearing mounted on the inner end of each half axle and movable with the same as such half axle is articulated, and stationary guide means coactable with said movable bearing and restricting the movements of said bearing to a vertical direction.

* * * * *